United States Patent Office 3,404,808
Patented Oct. 8, 1968

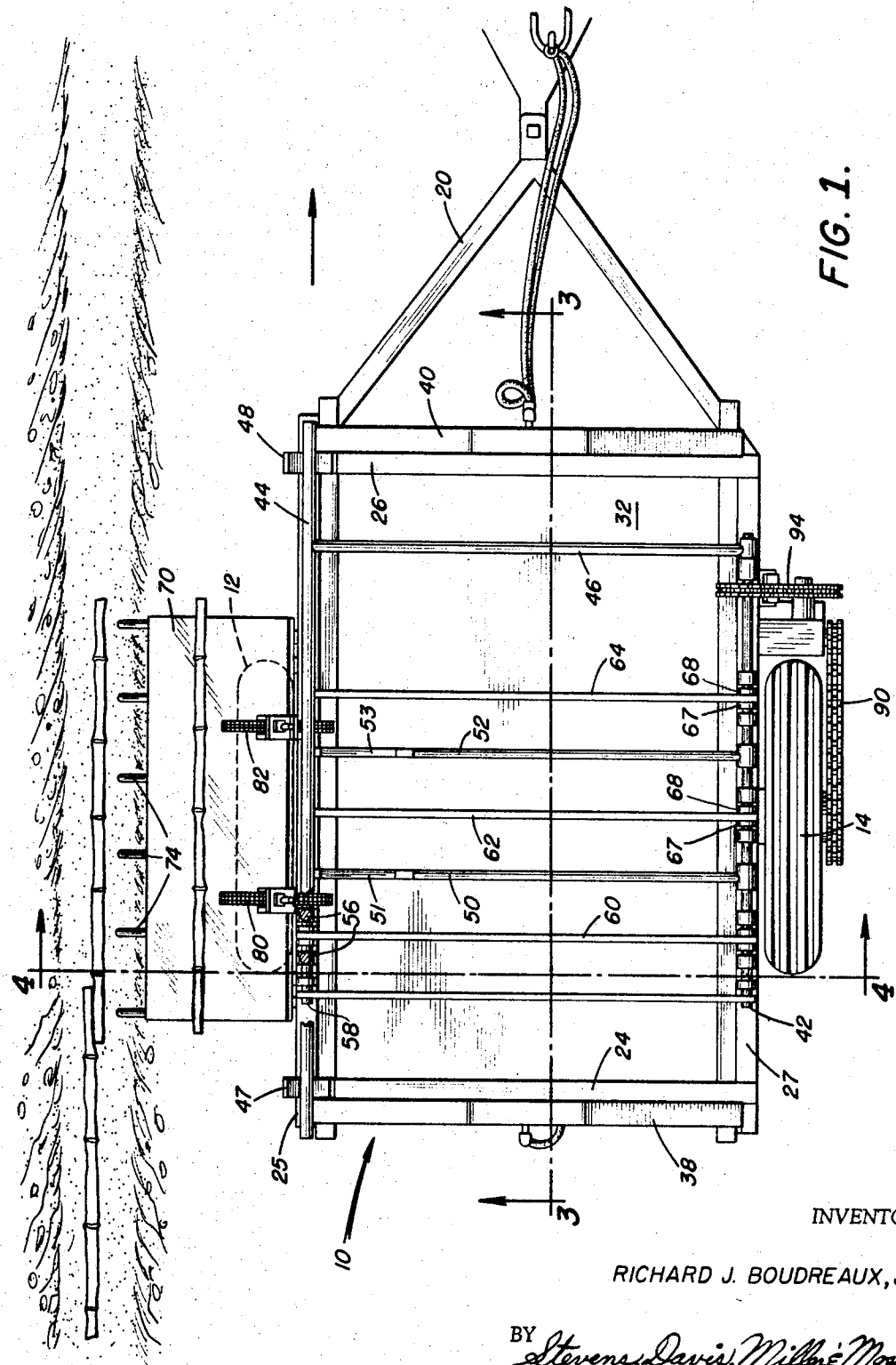

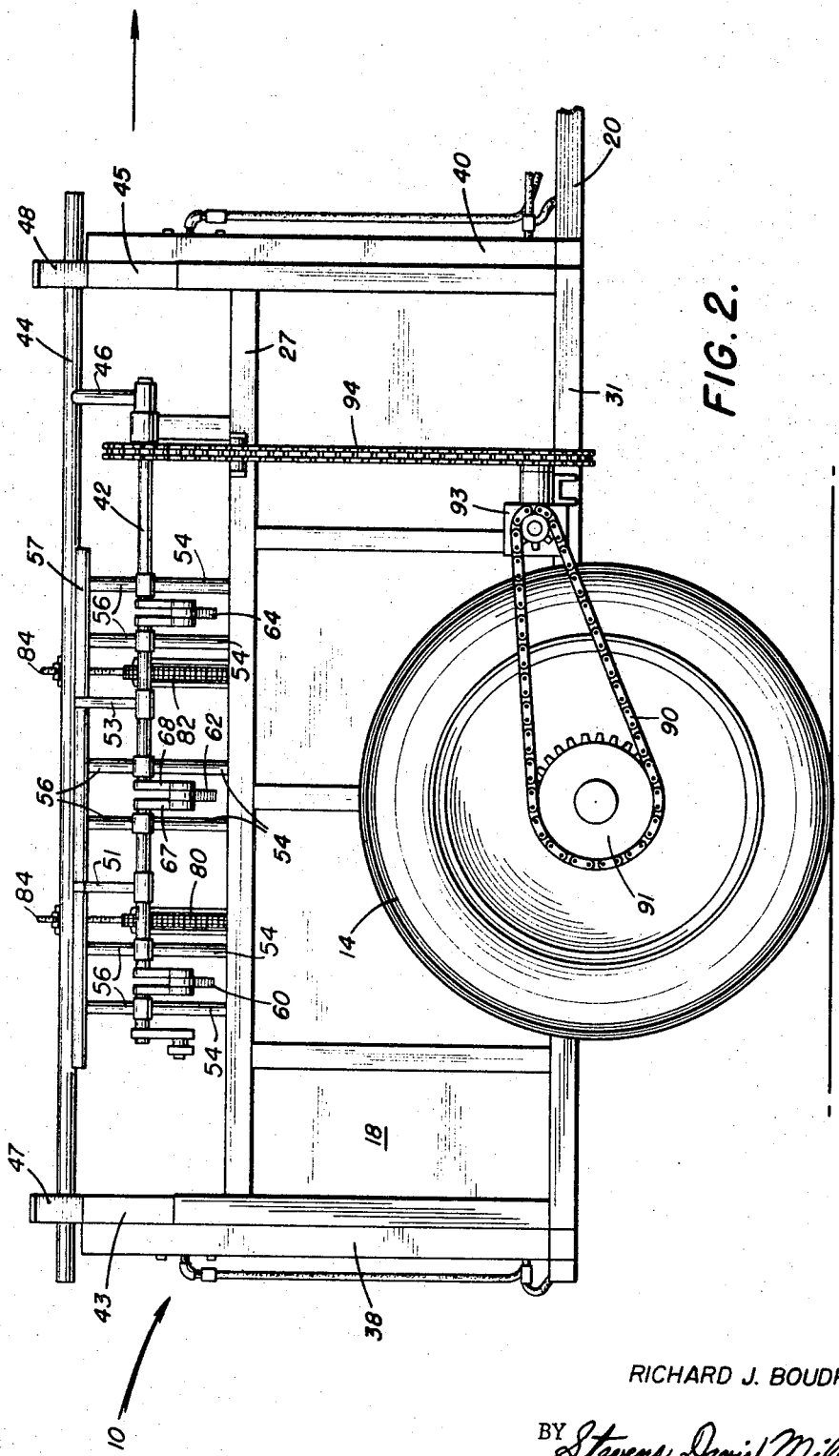

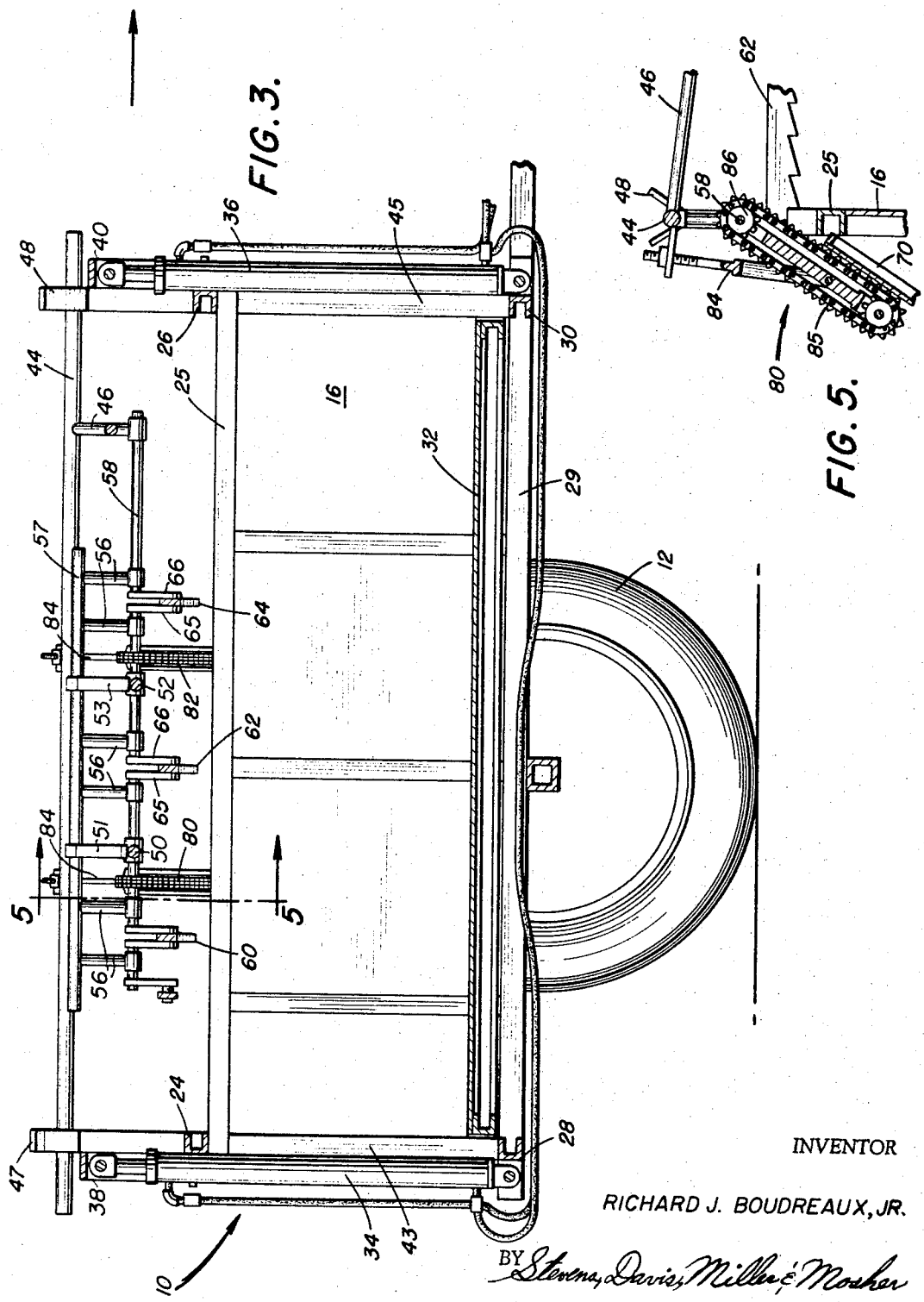

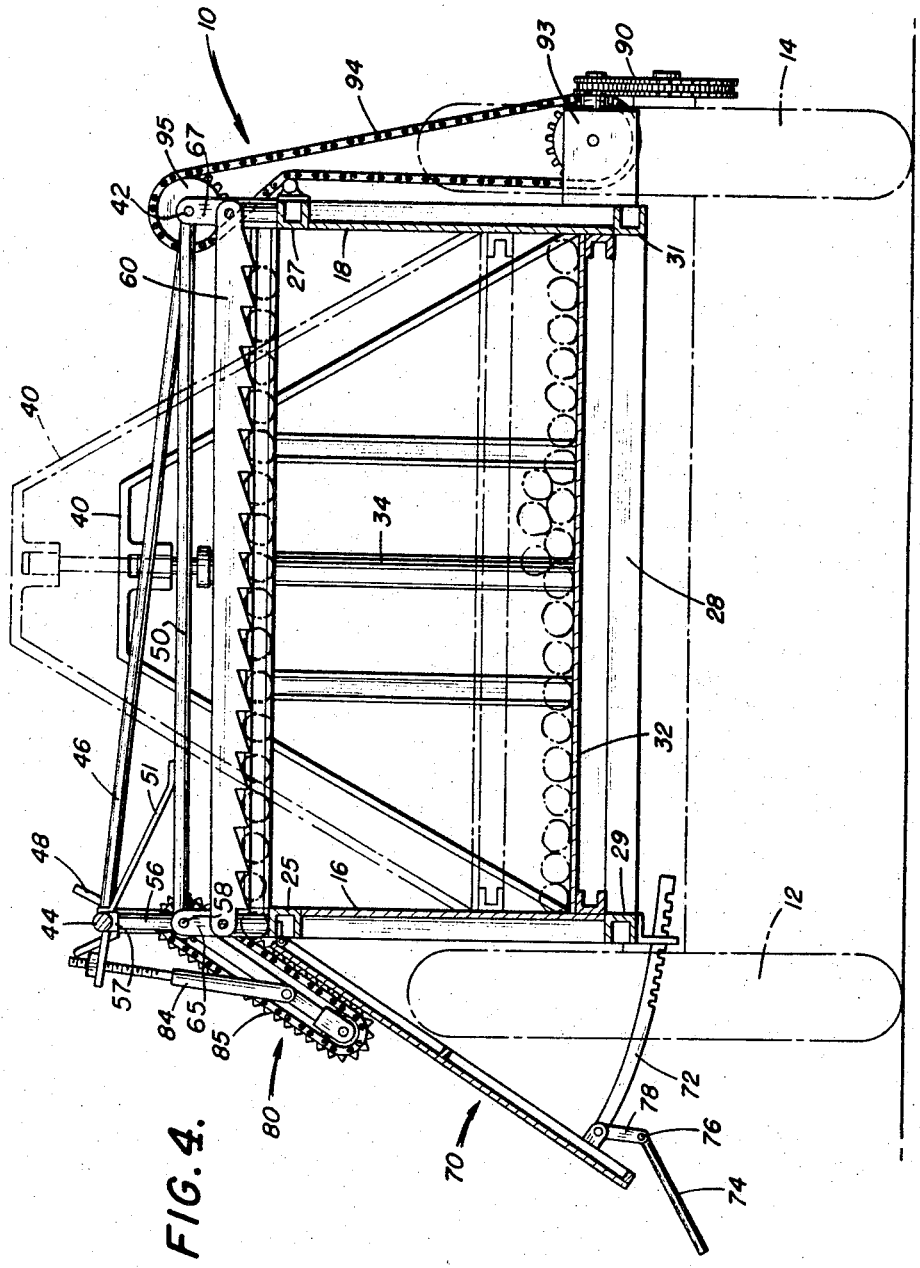

3,404,808
SUGARCANE PLANTER
Richard J. Boudreaux, Jr., 204 Louisiana Drive,
Thibodaux, La. 70301
Filed Jan. 24, 1966, Ser. No. 522,699
11 Claims. (Cl. 221—185)

ABSTRACT OF THE DISCLOSURE

Sugarcane stalks planting apparatus including a mobile vehicle having a vertically movable platform normally disposed in the bottom portion of a storage bin for receiving the stalks, and stalks displacing means extending horizontally over the bin and above the platform to engage and displace the stalks from the platform in a generally horizontal lateral direction relative to the bin. Stalks dispensing means are also carried by the vehicle to receive the stalks from the displacing means and dispense the stalks outwardly from the bin.

---

This invention relates to a sugarcane planter, and more particularly to an apparatus for distributing a load of sugarcane stalks to a predetermined ground position.

In the planting of sugarcane, the general practice is to initially dig a plurality of elongated parallel furrows in the ground, each furrow extending for the complete length of the area to be planted. Since the sugarcane stalks to be planted must be deposited in these furrows in a lengthwise or end-to-end relationship, it has heretofore been necessary to place these stalks in the furrows by hand, which, of course, results in an increased workload and a considerable expenditure of time and, therefore, expense.

Accordingly, it has become highly desirable to provide a mechanized apparatus that will effect the above.

It is, therefore, an object of this invention to provide an apparatus for distributing a plurality of sugarcane stalks into an elongated furrow for planting.

Briefly summarized, the present invention consists of a vehicle adapted and converted for planting sugarcane, the latter being loaded in a storage bin provided in the vehicle in the conventional manner. A plurality of connecting rods having sawtooth-like projections are rotatably connected to a crankshaft, extend across the upper portion of the vehicle, and in unison dispense the sugarcane stalks from the bin out laterally over the side of the vehicle. The floor of the bin, which is mounted to fluid controlled cylinders fore and aft, is raised toward the connecting rods which feed the cane stalks to the dispensing mechanism. These cylinders are of the conventional type and may be powered by an auxiliary valve controlled on the tractor. As the cane stalks are dispensed over the side, they are guided by an adjustable generally vertically disposed apron directly into the furrow, the lower part of the apron being adjustable horizontally so that the cane stalks may be guided into furrows of different sizes. Guiding means may also be provided which are coupled to the main frame of the vehicle, and are adapted to guide the cane stalks from the raised platform to the guide apron. The vehicle may be propelled in any known manner, as for example, by towing it behind a regular high clearance cane tractor.

Reference is now made to the accompanying drawings for a better understanding of the nature and objects of the present invention, which drawings illustrate the best mode presently contemplated for carrying out the objects of the invention and its principles, and are not to be construed as restrictions or limitations on its scope.

FIG. 1 is a plan view of the apparatus of the present invention;
FIG. 2 is a side elevational view of the apparatus of the present invention;
FIG. 3 is a transverse sectional view taken along line 3—3 of FIG. 1;
FIG. 4 is a transverse sectional view taken along line 4—4 of FIG. 1; and
FIG. 5 is a partial transverse sectional view taken along 5—5 of FIG. 3.

Referring now to the details of the invention, and especially to FIGS. 1 and 2, the reference numeral 10 refers in general to a vehicle which has been converted for planting sugarcane and which generally includes a pair of wheels 12 and 14, a lower frame portion, a pair of side walls 16 and 18, which form a storage bin, and an upper frame portion. Vehicle 10 may be propelled in any known manner, for example, by means of a tractor or the like (not shown) which is connected to the vehicle by connecting member 20.

The lower frame portion of vehicle 10 includes rear and front cross members 28 and 30, respectively, connected to lengthwise extending frame members 29 and 31, respectively, and form a storage bin which includes vertically extending reenforcing members as shown. The upper frame portion of the vehicle likewise includes cross members 24 and 26, respectively, connected to lengthwise extending frame members 25 and 27.

The number 32 represents a movable platform which is normally located at the bottom of the bin extending over the lower frame as seen in FIG. 3, and is adapted to be moved to and from a position adjacent the upper frame of the vehicle. This movement may be effected by use of any type of fluid controlled means such as a pair of hydraulically operated cylinders 34 and 36, which may be respectively connected to the rear and front portions of the frame of the vehicle. Yoke-like connecting members 38 and 40, respectively, connect the pistons of cylinders 34 and 36 to the platform and the cylinders are powered by an auxiliary valve (not shown) which may be remotely controlled on the tractor. The stalks are loaded onto platform 32 and are raised thereby to the upper portion of the vehicle to be dispensed laterally from the side thereof.

A pivotable frame is carried by the vehicle above the upper frame portion thereof and consists of a pivotally mounted crankshaft 42 extending along one side, a rod 44 extending along the other side, and a cross piece 46 connecting said crankshaft and said rod as better seen in FIGURE 1. Rod 44 is received by two Y-shaped members 47 and 48 which are respectively supported by posts 43 and 45 connected to the upper and lower frames of the vehicle at one side thereof.

The pivotable frame is carried by the upper portion of vehicle 10 by means of a plurality of vertically extending support rods shown generally at 54 in FIG. 2, said rods having suitable bearing members or the like in which crankshaft 42 is journaled. On the other side of vehicle 10 a support 57 is shown which is connected to the bottom portion of rod 44. Extending downwardly from support rod 57 are a plurality of rods shown generally at 56 which support shaft 58, the latter being journaled in bearing members or the like provided at the ends of rods 56. A pair of additional cross pieces 50 and 52 connect crankshaft 42 and shaft 58, and are further connected to rod 44 by means of angle braces 51 and 52, respectively.

A plurality of connecting rods 60, 62 and 64 are mounted on the pivotable frame above said platform, their ends being mounted on crankshaft 42 and shaft 58 for reciprocal movement therebetween to displace the sugarcane stalks outward over the side of the upper portion of vehicle 10. Each of these connecting rods is connected at each end to a crankpin which is respectfully disposed between a pair of crank arms located on crankshaft 42 and shaft 58. Referring to FIG. 2 for example, it is seen that one end of connecting rod 62 is rotatably mounted on a crankpin disposed between crank arms 67 and 68 on crankshaft 42. The other end of connecting rod 62 is rotatably mounted to a crankpin disposed between crank arms 65 and 66 as better seen in FIG. 3. The lower surface of each of the connecting rods 60, 62 and 64 are formed with sawtooth-like projections as shown in FIG. 4, which more easily and readily engage the stalk members. The use of three connecting rods is given only by way of example, it being understood that any number of rods may be utilized as necessary.

Crankshaft 42 is rotated by means of a mechanism shown better in FIGS. 2 and 4. Specifically, chain 90 is connected to sprocket 91 on the main axis of the vehicle and extends to gearbox 93, where the axis of rotation is changed. Chain 94 is connected to a sprocket on gearbox 93 and to sprocket 95, the latter being rigidly connected to crankshaft 42. A clutch mechanism of any known type may be used to disengage sprocket 91 from the main axis when the vehicle is to be moved while not in use.

A guide means is also provided to guide the dispensed sugarcane stalks from the upper side portion of the vehicle to a predetermined ground position. This guide means may better be seen from a reference to FIGS. 1 and 4 in which a guide apron 70 is shown pivotably mounted to the upper side portion of the vehicle and extending outwardly at an angle thereto. An angle adjusting rod 72 is provided which is rigidly connected to the lower portion of guide apron 70 and may be adjustably connected to the lower frame portion of vehicle 10 in order that the above mentioned angle may be adjusted as necessary. A plurality of finger-like projections, shown generally at 74, are also provided which extend further outward from the guide apron and which are rigidly secured to a shaft 76 which is rotated in a guide member 78, the latter extending from the lower portion of the guide apron. Thus the finger-like projections may be adjusted to extend from the guide apron at whatever angle is deemed necessary to aid in further guiding the sugarcane stalks directly into the furrow.

A plurality of mechanisms are provided for dispensing the sugarcane stalks from the raised platform to the guide apron, and are better shown by references to FIGS. 3, 4 and 5. These mechanisms are numbered 80 and 82, it being understood that any number can be utilized as necessary. Referring specifically to mechanism 80 by way of example, it is seen that it is pivotably mounted with respect to shaft 58 and has one end of an adjustable support member 84 connected thereto, the other end of member 84 being rigidly connected to the upper portion of the vehicle. An endless chain 85 is provided on mechanism 80 and is driven by sprocket 86 which is connected to shaft 58, the latter being rotated by means of its connection with connecting rods 60, 62 and 64. The stalks would thus pass from the finger-like projections of the connecting rods into a position between the chain 85 and guide apron 70, and would then be guided down apron 70 by use of the chain 85.

The operation of the device is as follows: the pivotable frame is pivoted upward about the crankshaft 42 and the desired amount of stalks to be planted are loaded on platform 32 which is initially placed in a lowered condition resting on the lower frame portion of vehicle 10. The pivotable frame is lowered, and the vehicle is then moved into the planting area and is guided to run parallel to the furrows to be planted. The operator then moves platform 32 upward by use of remote controls that operate the cylinders 34 and 36 until the stalks are engaged by connecting rods 60, 62 and 64, the latter being rotated through use of crankshaft 42 and moved generally from the right to the left while engaging the stalks as better seen in FIG. 5. As soon as these stalks leave the left end of the connecting rods, they are engaged by chain 85 of mechanism 80 and move downward on guide apron 70. The stalks then pass on down the lower portion of guide apron 70 and are guided therefrom by the projections 74 directly into the furrow. As the stalks are dispensed from the vehicle, the operator merely has to raise the platform 32 until another group of stalks are engaged by the movable connecting rods 60, 62 and 64 to be moved outwardly.

It is thus seen that this apparatus provides automatic means to dispense the sugarcane stalks into the furrows for planting.

Of course, variations of the specific construction and arrangement of this type mechanism herein disclosed can be made by those skilled in the art without departing from the invention as defined in the appended claims.

What is claimed is:

1. Sugarcane stalks planting apparatus comprising a mobile vehicle having a storage bin and an elevatable platform normally disposed in the bottom portion of said bin, means carried by said vehicle for elevating said platform, stalks displacing means mounted above said platform and adapted to engage and displace said stalks in a generally lateral direction relative to said bin, means carried by said vehicle to receive said stalks and to guide the stalks to a predetermined ground position, a frame structure disposed on the upper portion of said vehicle, and a crankshaft rotatably mounted on said frame and coupled to and rotatably driven by the main axle of said vehicle, said stalks displacing means being connected to said crankshaft.

2. The device of claim 1, further comprising means pivotally mounting said frame on said upper portion of said vehicle so that said frame is pivotable from a normal horizontal position to a vertical open position to permit the loading of stalks on said platform.

3. The device of claim 1 further comprising an endless chain connected to the main axle of said vehicle and to said crankshaft for coupling said axle and crankshaft to rotatably drive said crankshaft.

4. Sugarcane stalks planting apparatus, comprising a mobile vehicle having a storage bin and a platform normally disposed in the bottom portion of said bin for receiving said stalks, means carried by said vehicle for raising and lowering said platform, stalks displacing means extending substantially horizontally over said bin and above said platform and adapted to engage and displace said stalks from said platform in a generally horizontal lateral direction relative to said bin, stalks dispensing means carried by said vehicle to receive said stalks from said displacing means and dispense said stalks outwardly from said bin, said stalks displacing means being provided with depending projections to engage said stalks, a frame structure disposed on the upper portion of said vehicle, and a crankshaft rotatably mounted on said frame and coupled to and rotatably driven by the main axle of said vehicle, said stalks displacing means being connected to said crankshaft.

5. The device of claim 4, wherein said means for raising and lowering said platform comprises at least one fluid controlled elevating means mounted on said vehicle and operatively connected to said platform.

6. The device of claim 4, wherein said frame is pivotable with respect to said vehicle from a normal horizontal position to a vertical open position to permit the loading of stalks on said platform.

7. The device of claim 4, further comprising an endless chain connected to the main axle of said vehicle and to said crankshaft for coupling said axle and crankshaft to rotatably drive said crankshaft.

8. The device of claim 4, further comprising a guide apron extending outward from said vehicle and downward at an angle with respect thereto, said guide apron adapted to receive the stalks from said dispensing means and guide the stalks to a predetermined ground position.

9. The device of claim 8, wherein said stalks are loaded onto and dispensed from the side of said platform with their longitudinal axes extending in a direction parallel to the direction of travel of said vehicle.

10. The device of claim 8, further comprising means to vary said angle.

11. The device of claim 8, further comprising a plurality of finger-like projections disposed on said guide apron and extending outward therefrom at an angle thereto, and means to vary said latter angle.

References Cited

UNITED STATES PATENTS

| | | | |
|---|---|---|---|
| 673,360 | 4/1901 | Dequede | 198—222 |
| 1,360,422 | 11/1920 | Lyon | 221—226 |
| 2,420,812 | 5/1947 | Brunner | 221—174 |
| 2,840,269 | 6/1958 | Anderson | 221—185 |
| 3,160,313 | 12/1964 | Marohn | 221—226 XR |

FOREIGN PATENTS 739,545  12/1943  Germany.

WALTER SOBIN, *Primary Examiner.*